United States Patent [19]

Janiaud

[11] Patent Number: 4,659,146
[45] Date of Patent: Apr. 21, 1987

[54] ARTICULATION OF THE SEAT BACK OF A SEAT FOR VARIOUS VEHICLES

[75] Inventor: André M. C. Janiaud, Paris, France

[73] Assignee: Tubauto, Levallois-Perret, France

[21] Appl. No.: 865,635

[22] Filed: May 14, 1986

Related U.S. Application Data

[63] Continuation-in-part of Ser. No. 583,259, Feb. 24, 1984, abandoned.

[30] Foreign Application Priority Data

Mar. 1, 1983 [FR] France ................................ 83 03318
Jun. 24, 1983 [FR] France ................................ 83 10464

[51] Int. Cl.⁴ .............................................. B60N 1/02
[52] U.S. Cl. .................................... 297/367; 297/355; 297/365
[58] Field of Search ................................ 297/366–371, 297/361, 362, 378, 379, 354, 355, 363–365

[56] References Cited

U.S. PATENT DOCUMENTS

| 4,087,885 | 5/1978 | Gillentine | 297/367 |
| 4,175,301 | 11/1979 | Ledouxnoux et al. | 297/370 |
| 4,184,714 | 1/1980 | Courtois | 297/370 |
| 4,269,447 | 5/1981 | Dottori | 297/367 |
| 4,348,050 | 9/1982 | Ledouxnoux et al. | 297/367 |
| 4,366,982 | 1/1983 | Bassi | 297/361 |
| 4,384,744 | 5/1983 | Barley | 297/367 |

FOREIGN PATENT DOCUMENTS

| 2019707 | 11/1971 | Fed. Rep. of Germany | 297/366 |
| 2364755 | 8/1974 | Fed. Rep. of Germany | 297/367 |
| 2454429 | 5/1976 | Fed. Rep. of Germany | 297/367 |
| 1296060 | 5/1962 | France | 297/367 |
| 1414700 | 9/1965 | France | 297/366 |
| 1422063 | 1/1976 | United Kingdom | 297/366 |

Primary Examiner—James T. McCall
Assistant Examiner—Mark W. Binder
Attorney, Agent, or Firm—Browdy and Neimark

[57] ABSTRACT

An articulation in which a fixed iron member fixedly mounted with a seat frame comprises control means acting on an eccentric member causing upon rotation a locking and respectively an unlocking of a toothed center bearing plate. The toothed center bearing plate has such a shape that when it is pushed on the toothing of the iron member fixedly mounted with the seat frame, it is laterally blocked by reaction thus preventing any lateral displacement even if the mating cooperating toothings comprise some clearance. A rotation pin of the seat back with respect to the seat frame is so shaped that it is supported on two different points on an ovalized bearing member of the iron member fixedly mounted with the seat frame.

12 Claims, 7 Drawing Figures

Fig. 6

ARTICULATION OF THE SEAT BACK OF A SEAT FOR VARIOUS VEHICLES

This application is a continuation-in-part of application Ser. No. 583,259, filed Feb. 24, 1984, now abandoned.

FIELD OF THE INVENTION

The present invention relates to an articulation of the seat back of a seat for various vehicles.

BACKGROUND OF THE INVENTION

There is already known for a long time vehicle seats currently used in airplanes, trains or automobile vehicles, these seats comprising a seat back the inclination of which can be adjusted relatively to a seat frame. A plurality of more or less complicated discontinuous mechanisms have already been proposed for adjusting a seat back with respect to a seat frame. However all the known mechanisms have particular drawbacks in that, with a certain time of use, because of the design of the articulation and also because of vibrations to the vehicle, clearances are formed both in the toothing of the members provided for locking the seat back with respect to the seat frame and in the rotation pin mounted between the seat frame and the seat back since the rotation pin is only supported on one point of the bearing member. Therefore, on the one hand, the safety is not properly ensured and, on the other hand, the seat back is not rigidly fixed and provides therefore a bad impression for the seat user.

OBJECTS AND SUMMARY OF THE INVENTION

The present invention remedies the above drawbacks by providing an articulation of a seat back having means for safety accomodating the clearances on the locking means of the seat back with respect to the seat frame and having a pin construction accommodating the clearances which could be produced on the articulation pin of the seat back with respect to the seat frame.

It should first be reminded that each seat has at its rear lower part two identical articulations which are controlled by a single lever placed either on the left hand side or on the right hand side of the seat according to the space left free in the vehicle and according to the type of vehicle in which the seat is mounted. Actually, if for automobile vehicles the front seats have generally control means for each seat, the control means being placed on the left hand side for the left seat and on the right hand side for the right seat, this is not the case for the seats in aeroplanes, cars and trains, in which the control means can be mounted in the vicinity of the elbowrest or on the elbowrest separating two adjacent seats and, therefore, the control means can be mounted on the left hand side and/or the right hand side according to the place and the pitch which is used for placing the seats.

According to the invention on both sides of the seat, the articulation of the seat back comprises control means placed on an iron member fixedly mounted with the seat frame, said control means acting on an eccentric member causing upon its rotation a locking and respectively an unlocking of a toothed center bearing plate, said toothed center bearing plate having such a shape that when it is pushed on a toothing of the iron member fixedly mounted with the seat frame, this center bearing plate is laterally locked by reaction thus preventing any lateral displacement even if the mating toothings have some clearances, then a rotation pin of the seat back with respect to the seat frame is so shaped that the pin which is generally fixed to the fixedly mounted iron member and therefore to the seat frame, is supported on two different points on an ovalized bearing member of the fixedly mounted iron member while ensuring a safe locking of the seat frame with respect to the seat member even if there is some clearance between the parts enabling to the seat back to angularly move with respect to the seat frame.

According to another feature of the invention, the toothed center bearing plate is made of two elements which are relatively separated by a cut line having such an inclination that the force exerted from bottom to top by the eccentric member provides a lateral resultant force locking the center bearing plate against one slide means used for guiding the sliding center bearing plate.

Various other features of the invention will moreover be revealed from the following detailed disclosure.

BRIEF DESCRIPTION OF THE DRAWINGS

Embodiments of the invention are shown as non limitative examples in the accompanying drawings, wherein.

DETAILED DESCRIPTION OF THE INVENTION

Figure 1:
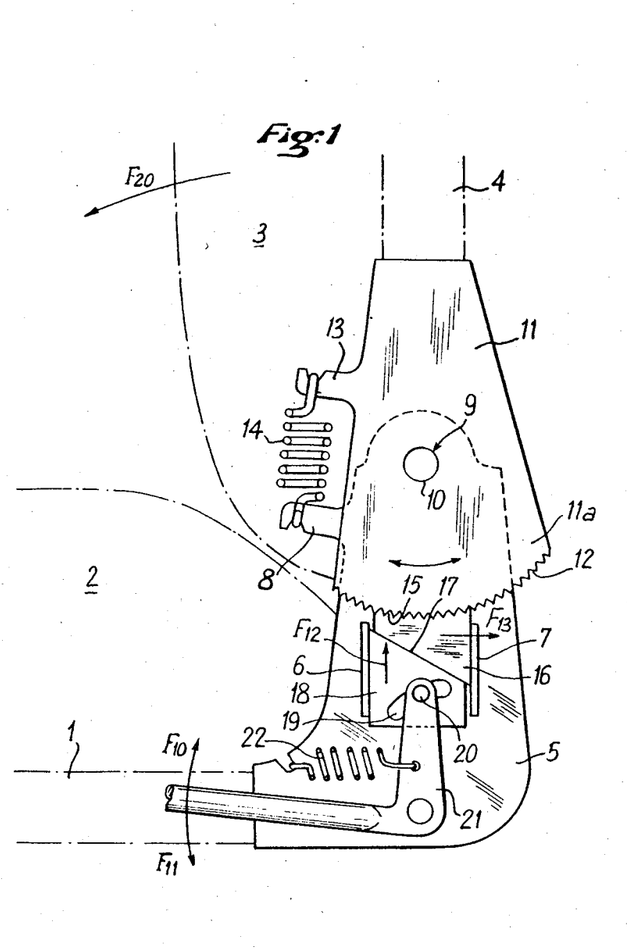
FIG. 1 is a side elevation view of a first embodiment of the articulation mounted between the fixed armature of the seat frame and the mobile armature of the seat back.

Referring now to the drawings and more particularly to FIG. 1, reference numeral 1 shows the armature of a seat frame 2 of a vehicle seat. As usual, the armature 1 is made of suitably shaped tubes on which rests a resilient sheet supporting on the one hand an upholstery and on the other hand a coating means forming the outer surface of the seat frame.

Figure 3:
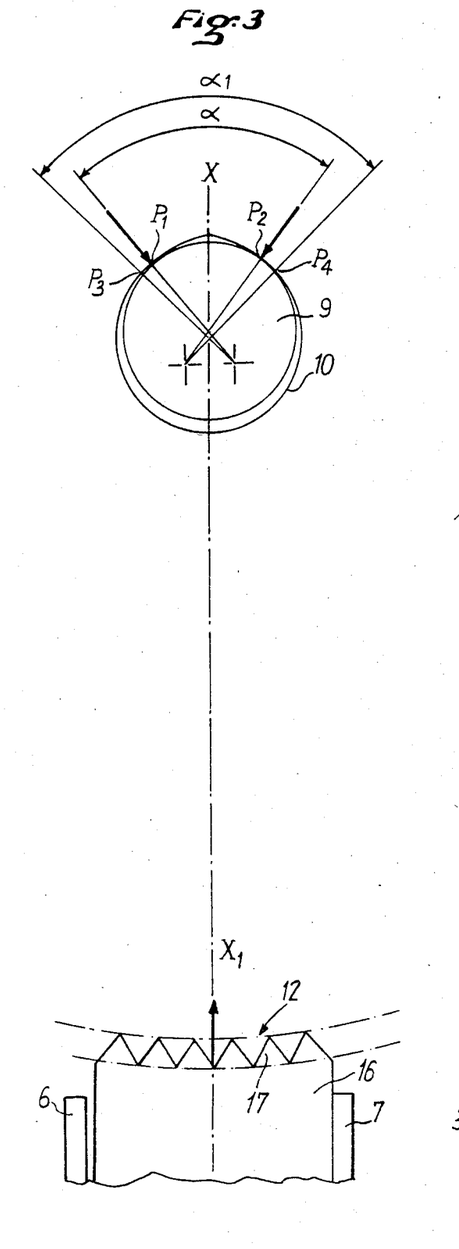
FIG. 3 is a diagrammatic cross sectional view showing the rotation pin of the articulation supported on two symetrical points on a bearing member, ensuring thereby a safe positioning of the seat back with respect to the seat member.

The seat back 3 comprises an armature 4 made also generally of tubes and covered by a resilient sheet carrying a cushion coated with a fabric. The rear part of the armature 1 of the seat frame 2 comprises, in the present embodiment, an L-shaped iron member 5 having a flat part fixed to the armature 1 and which has a vertical area provided with two parallel slide members 6, 7, a hooking arm 8 and an upper part provided with a pin 9 (see also FIG. 3) on which is mounted a bearing member 10 of an iron member 11 fixedly mounted at end of the iron member 4 of the seat frame 3. The iron member 11 has substantially the shape of a trapezium with a base 11a which is toothed at 12 and has also a hooking arm 13 on which is mounted a spring 14 secured between the hooking arm 13 and the hooking arm 8 of the iron member 5.

As better shown in FIG. 1, the toothing 12 is arcuate and cooperates with the toothing 15 carried by the upper end of a toothed center bearing plate 16 the lower side 17 of which is angularly cut for cooperating with a tooth 18 having an upper side 19 which is cut according to the same angle as the lower side 17 of the toothed center bearing plate 16. The toothed center bearing plate 16 as well as the tooth 18 are placed between the slide members 6, 7 and, moreover, the tooth 18 is provided with an arcuate window 19 and cooperates with a lug 20 mounted at end of a lever 21 based by a spring 22 having one end hooked on the vertical part of the lever 21 and another end which is hooked on the iron member 5.

Therefore and as shown in FIG. 1, the lever 21 has a tendency to pivot under action of the spring 22 in direction of the arrow F11 while pushing, by means of the lug 20 and the arcuate window or slot 19, the tooth 18 in direction of the arrow F12, i.e. upwardly, which thus causes a raise of the toothed center bearing member 16. However, the inclined planes 17, 19 cause the toothed center bearing plate 16 to be pushed in direction of the arrow F13 against a slide member 7 while causing therefore a safe and without clearance locking of the two toothings 12 and 15 the one with respect to the other, thereby providing a safe position of the iron member 11 with respect to the iron member 15.

The seat back 3 is therefore correctly locked with respect to the seat frame 2, but, moreover, since the cylindrical pin 9 is supported (FIG. 3) in the bearing member 10, it is carried on two points P1 and P2 in the bearing member 10, the two points P1, P2 being symetricaly arranged with respect to a vertical axis X, X1 of the articulation of the seat. Actually, the bearing member 10 has a substantially ovoidal or egg shaped form as shown in the drawings. Therefore, and even if we assume that following working of the seat and vibrations of the vehicle, some clearance is produced and will distort the pin 9, the pin 9 is always supported in the bearing member 10 between the points P1, P2 (angle α) and the points P3, P4 (angle α1) (see FIG. 3) which ensures together with the locking of the center bearing plate 16, a constant and firm maintenance of the seat back 3 with respect to the seat frame 2 since the spring 14 has a tendency to permanently return, in direction of the arrow F20 (see FIG. 1), the seat back against the back of a person sitting in the vehicle.

There is thus obtained, through the sliding center bearing plate 16 having such a particular constitution causing a locking of the toothings 12, 15 the one with respect to the other and through the support of the pin 9 on two symetrical points P1, P2 of the bearing member 10, a clearance which is necessary for a good working of the articulation of the seat back with respect to the seat member, as well as in the same time an unusual comfort avoiding noise and annoying vibrations for the user of the seat. There is thus obtained a perfect comfort, even if we assume manufacturing tolerances greater than the presently existing manufacturing tolerances, which makes possible to use manufacturing means which are simpler and to obtain articulations of seat back at a price which is lower than the price of existing articulations. Unlocking of the articulation of FIG. 1 is caused by making the lever 21 to pivot in the direction of the arrow F10 against action of the spring 22.

Figure 2:
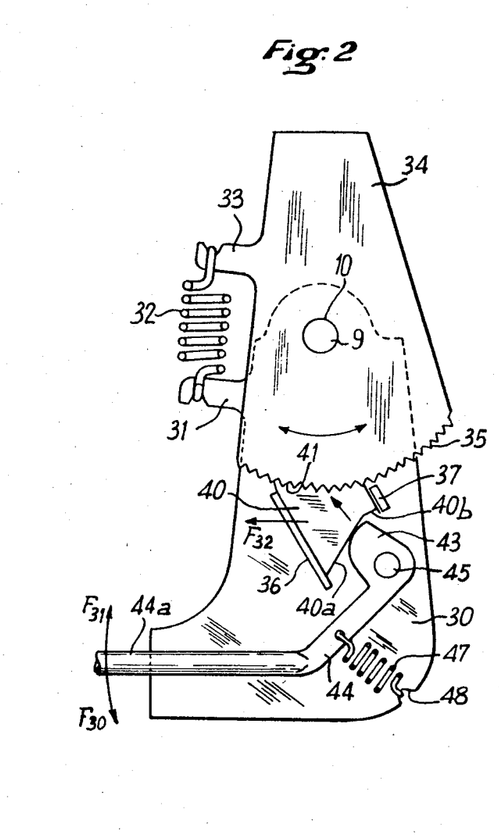
FIG. 2 is a side elevation view showing a slight variant of embodiment of the articulation of the seat back.

In FIG. 2, there has been only shown a lower iron member 30 which is fixedly mounted with the seat frame and which has a shape which is identical to the above described shape. The hooking arm 31 is used for supporting a spring 32 which is secured on the hooking arm 33 of the upper iron member 34 fixedly mounted with the armature of the seat. The spring 32 has therefore a tendency to permanently return the seat back against the back of the user. The iron member 34, which has the same shape as the above described iron member 11 and which comprises a lower arcuate toothing 35, is provided substantially centrally with a bearing member 10 in which comes through the pin 9 of the iron member 30. The iron member 30 comprises, under the iron member 34, two inclined slide members 36, 37 which are parallelly mounted and between which is located a sliding center bearing plate 40 comprising a toothing 41 at the upper part thereof. The sliding member bearing plate 40 is cut at the lower part thereof so as to form a double slope 40a, 40b having the shape of an inverted V with a large opening. The slope 40a permanently rests against a fixed cam 43 at end of a lever 44 which is pivotally mounted on a pin 45 fixed with the iron member 30. The front part 44a of the lever 44 carries a handling member (not shown), and the lever 44 is returned in direction of the arrow F30 (FIG. 2) by means of a spring 47 fixed by one of its ends on the lever 44 and by another end on a notch 48 provided in the iron member 30.

Figure 4:
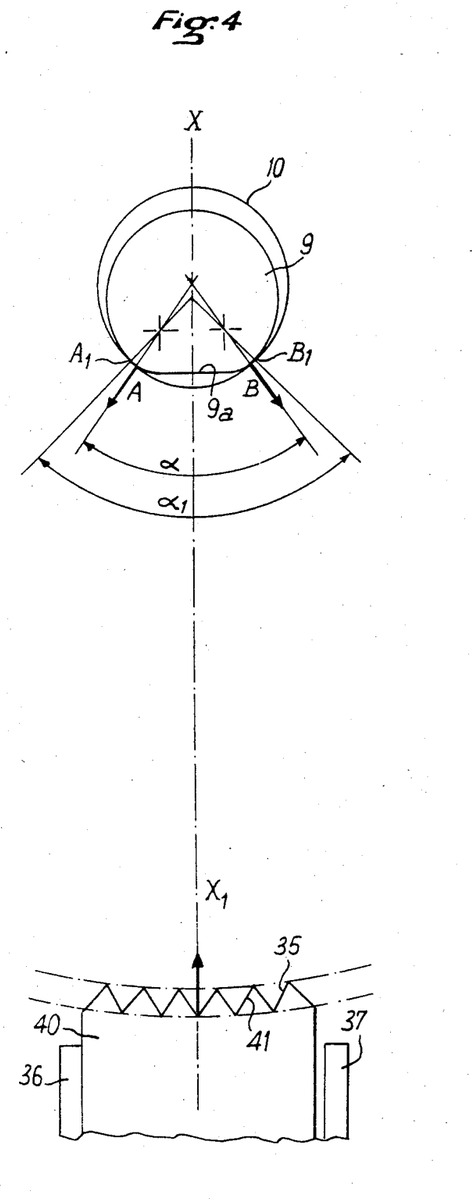
FIG. 4 shows a variant of embodiment of the rotation pin of the seat back with respect to the seat member.

By raising the lever 44 in direction of the arrow F31, the cam 43 is caused to pivot about the pin 45 and thereby to disengage the center bearing plate 40 which can slide rearwardly along the slide member 36. The toothing 35 which is thus disengaged from the iron member 30 can pivot in one direction or in an other direction according to the desired adjustment of the seat back. By releasing the lever 44, the spring 47 returns the lever 44 in direction of the arrow F30, and the cam 43 enables a locking of the toothing 41 of the center bearing plate 40 in the toothing 35 of the iron member 34. The slope 40a of the center bearing plate 40 causes, by reaction, the center bearing plate 40 to firmly press against the slide member 36 in direction of the arrow G32 (resulting from the application force of the spring 47 on the cam 43) which therefore causes a very strong application of the pin 9 (see FIG. 4) at a point A and at a point B on the bearing member 10 fixedly mounted with the iron member 34. As shown in FIG. 4, the pin 9 comprises a horizontal flat 9a enabling application of the points A and B of the pin 9 on the bearing member 10 while forming an angle α. As in the preceding case, the points A and B are symetrically arranged with respect to the vertical axis X, X1 of the articulation and, even by assuming that a clearance is produced, the points A and B are outwardly shifted in A1 and B1 as shown by the angle α1.

There is thus obtained, as in the preceding case, a safe and without clearance locking of the seat back with respect to the seat frame.

Figure 5:
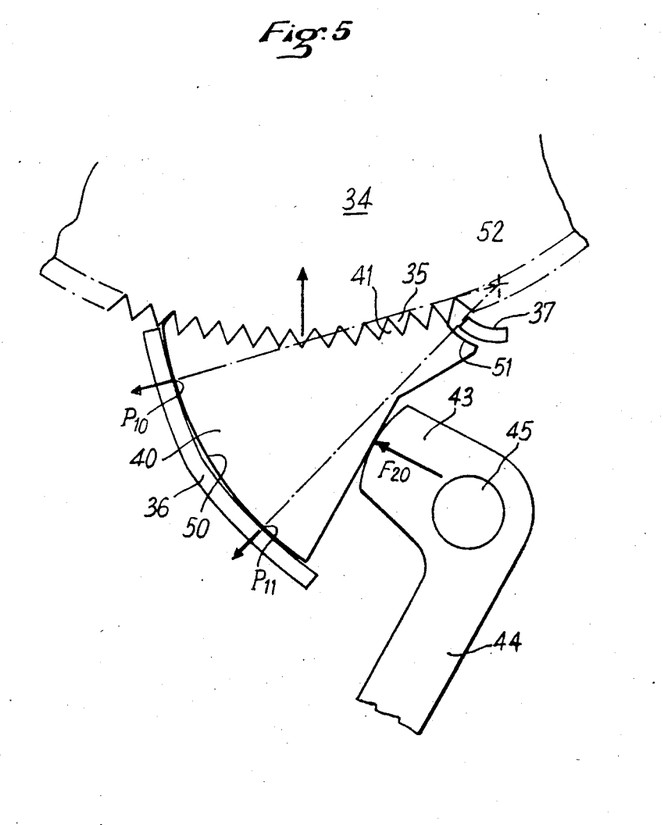
FIG. 5 is a diagrammatic side elevation view of another variant of embodiment of the articulation of the seat back.

In FIG. 5, there has been diagrammatically shown an iron member 34 fixedly mounted with the seat back and comprising at the lower part thereof the toothing 35 which cooperates with the center bearing plate 40 provided at the upper part thereof with the toothing 41. In this case, however, the center bearing plate 40 has arcuately shaped longitudinal edges 50, 51 which are substantially parallel since they come from a same theoretical center 52. In this case, the slide members 36, 37 are also substantially of an arcuate shape in order to guide the sliding center bearing plate 40 upon its upward and downward movement according to whether it is desired to lock or unlock the toothing 41 of the center bearing plate 40 from the toothing 35 of the iron member 34.

As it has already been explained, the cam 43 by acting in direction of the arow F20 causes, upon a raise of the center bearing plate 40 (FIG. 2), i.e. upon locking, an application of the center bearing plate 40 along the slide member 36 in two points P10, P11 because of the resultant caused by the force F20.

The later embodiment enables a smaller mean and end attack angle of the toothing 41 of the center bearing plate 40 on the toothing 36 of the iron member 34 than with a rectilinearly sliding center bearing plate. There is thus provided a greater designing freedom and it is therefore possible to use a toothing having a more closed angle, which is preferred on a mechanical plane of view.

Obviously, the articulation of the iron member 34 on the fixed iron member can also be made either with an ovalized bearing member (FIG. 3), and in this case the pin is substantially of a cylindrical shape or, conversely, with a cylindrical bearing member, and then the pin comprises a flat (FIG. 4). Moreover, and although it is preferred that the rotation pin with a flat or the ovalized bearing member is fixedly mounted with the fixed iron member, it is also possible to make the opposite, i.e. that the two members are fixedly mounted with the mobile iron member enabling the articulation of the seat.

Figure 6:
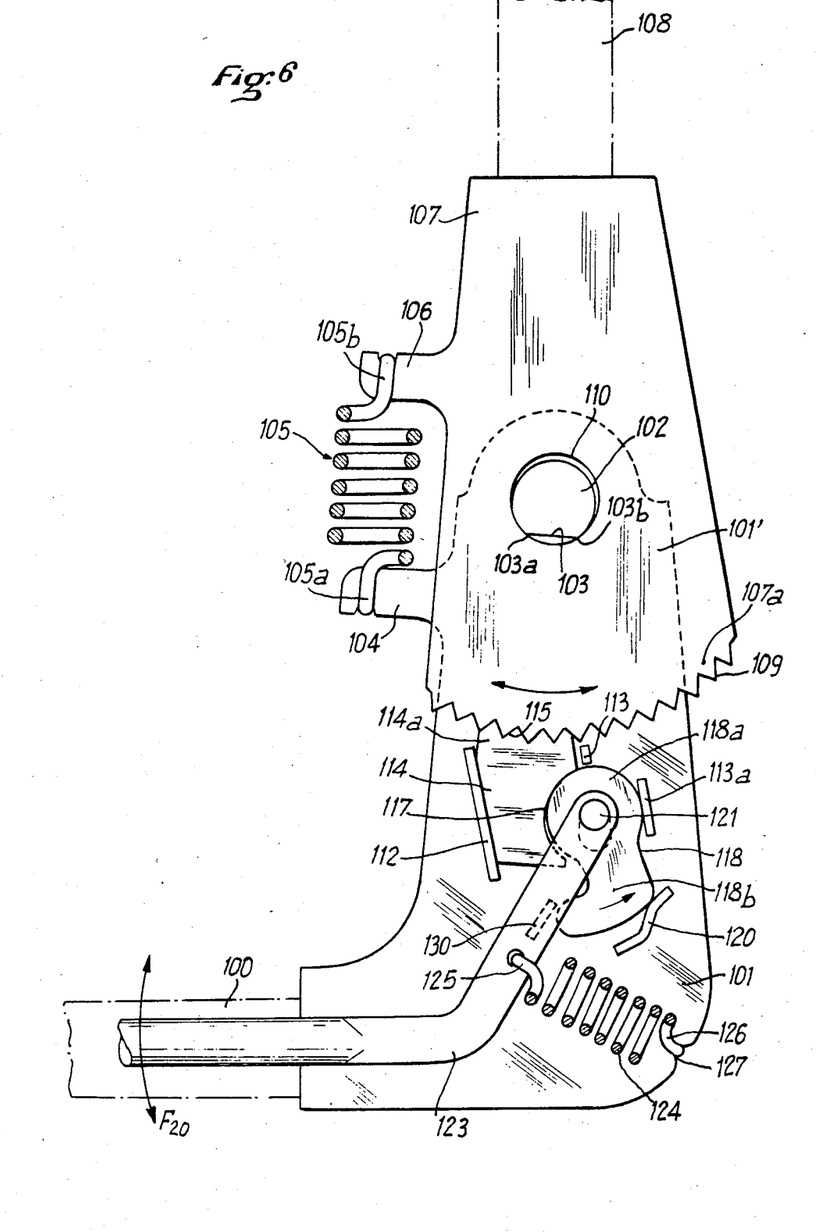
FIG. 6 is a side elevation view of an articulation according to the invention in a locked position.
Figure 7:
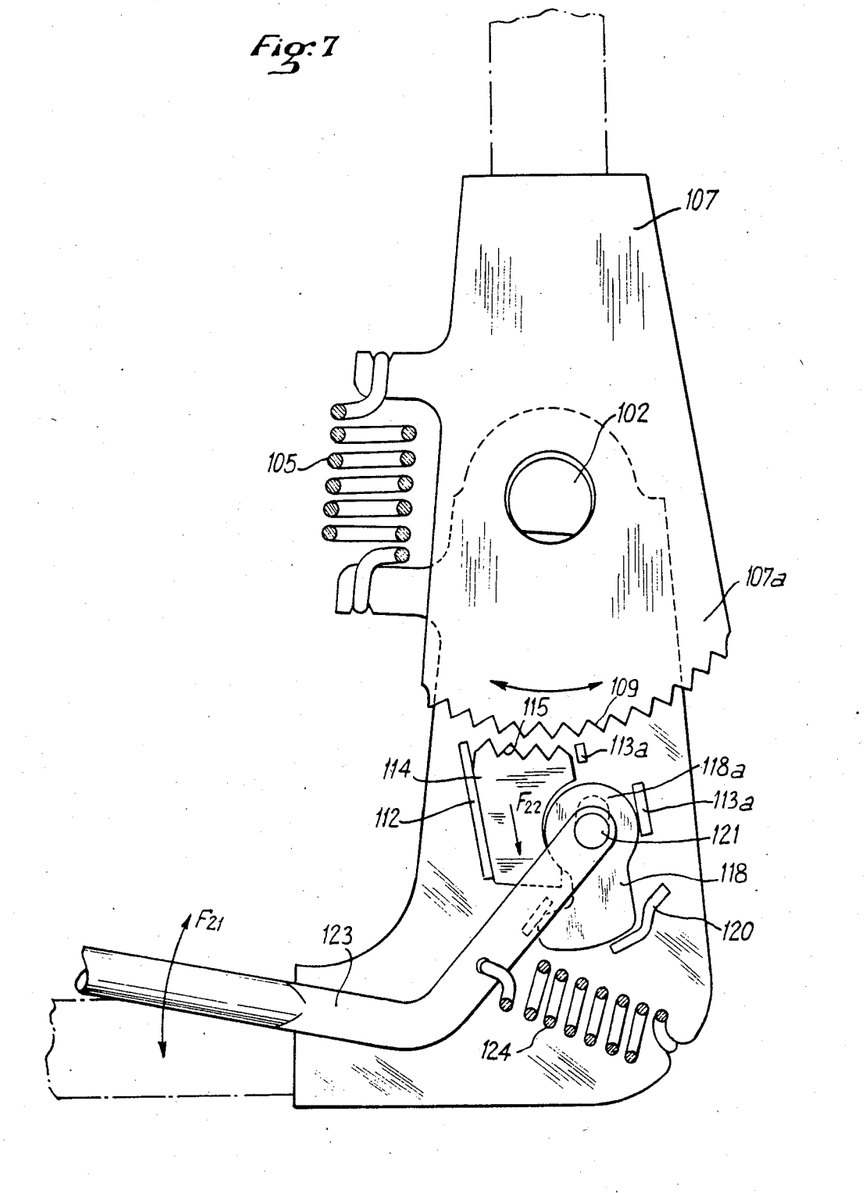
FIG. 7 is a side elevation view of the articulation in an unlocked position.

FIGS. 6 and 7 show another embodiment for controlling two mobile center bearing plates which are parts of the two articulations of a seat in order to ensure a stability of the seat back with respect to the seat member in all the cases, even when all parts have taken clearances.

In FIG. 6, there has been shown in mixed lines a part 100 of the armature of the seat which carries a fixed iron member 101 the upper part 101' of which has a pin 102 which has, at its lower part, a flat 103. The cheek 101 carries at its front part an arm 104 on which is hooked the end 105a of a spring 105 the other end 105b of which is fixed on an arm 106 fixedly mounted on the front part of a mobile cheek 107 which is fixedly mounted with the armature 108 of the seat.

The mobile cheek 107 which carries an arcuate toothing 109 at its lower part 107a is engaged on the pin 102 through a bore 110 of a diameter greater than the diameter of the pin 102. The seat back can therefore pivot freely around the pin 102 by means of the bore 110.

FIG. 6 shows only the left hand side part of the seat; obviously the same construction exists on the right hand side of the seat.

The fixed lower iron member 101 carries guiding means 112-113 substantially parallel and between which can slide a mobile center bearing member 114 having a toothing 115 at its upper part 114a, the toothing 115 being provided for cooperating with the arcuate toothing 109 of the mobile iron member 107. The center bearing plate 114 is provided at the lower part thereof with an arcuate cut 117 under the guide means 113 and in which enters the enlarged upper periphery 118a of a cam 118 the lower part 118b of which has a shape of a foot having a lower side cooperating with a locking counter-cam 120 fixedly mounted with the fixed cheek 101.

The cam 118 is mounted on a connecting shaft 121 mounted within a slot (shown in phantom lines) carried by the fixed cheek 101 having an outer free part carrying a control lever 123 which has a tendency to be returned in a rest position by a spring 124 secured by its end 125 on the lever 123 and by its end 126 in a notch 127 provided at the rear lower part of the fixed cheek 120.

Lastly, a second counter-cam 130 is provided on the fixed cheek 101 in front of the cam foot 118b for limiting the stroke thereof.

As shown in FIG. 6, when the seat back is locked in any position on the seat frame, the toothing 115 of the center bearing plate 114 enters the arcuate toothing 109 of the mobile cheek 107 under action of the cam 118 the part 118b of which bears against the cam 120 while pushing the center bearing plate 114 against the slide means 112 thereof ensuring thereby a perfect locking of the seat back with respect to the seat frame since, further, and because of the flat 103, the bore 110 of the mobile cheek 107 is supported on two points 103a–103b of the pin 102. The spring 124 by downwardly returning the lever 123 in direction of the arrow F20 (FIG. 6) causes a second imperative locking of the center bearing plate 114 by the upper part 118a of the cam 118 which is in a permanent abutment against the slide means 113a arranged parallely to the slide means 112.

When it is desired to modify the position of the seat back, the lever 123 is raised in direction of the arrow F21 (FIG. 7) against action of the spring 124. The movement of the lever 123 causes a rotation of the connecting shaft 121 and therefore a pivoting of the head 118a of the cam 118 which causes a lowering in the direction of the arrow F22 of the center bearing plate 114 because of the cooperation of the enlarged upper part 118a of the cam 118 with the rear arcuate cut 117 of the center bearing plate 114.

Therefore, the toothing 115 of the center bearing plate 114 disengage obligatorily the arcuate toothing 109 provided at the lower part 107a of the mobile cheek 107.

The guide means 114, 113, 113a ensure a perfect guiding of two mobile parts during their movement driving the foot 118b of the cam 118 coming into contact with the counter cam 130 and the lower part of the counter-cam 120 (FIG. 7). The toothings being respectively disengaged, it is then possible to adjust at will the position of the seat back which has a tendency to return on the back of the user because of the bias of the spring 105. In the desired position of the seat back and by releasing the lever 123 which is returned by the spring 124, the cam 118 and the center bearing plate 114 take again also their first position, i.e. the position shown in FIG. 6 in which the cooperation of the mobile center bearing plate 114 with the pin 102 having a flat 103 and the bore 110 enables a perfect locking of the seat back with respect to the seat frame even if after a wearing of the toothings 109 and 115 and of the outer periphery 118a of the cam 118, there could happen clearances detrimental to a good positioning of the seat back with respect to the seat frame. There is thus provided a three-point locking (points 103a, 103b and bearing point of the sliding center bearing plate 114 on the guide means 112) thereby ensuring a perfect stability of the seat back.

I claim:

1. An articulation for a seat back of a vehicle seat, comprising:

a first iron member fixed to the frame of the seat back, said first iron member having an aperture located centrally thereof and an arcuate lower edge having teeth, said aperture having a given cross-section, a second iron member fixed to the frame of the vehicle seat and including a pin carried at an upper end thereof, said pin having a given cross-section, the given cross-section of said pin being smaller than that of said aperture, and said pin engaging through said aperture whereby said first and second iron members are pivotably coupled, resilient means, coupled between said first and second iron members, for pivotably biasing said first iron member in a forward direction about said pin, spaced parallel guide means, carried by said second iron member, a plate member positioned between said guide means for movement in reciprocable direction relative to said guide means and having a lower surface and an upper edge bearing teeth for locking cooperation with the teeth on the lower edge of said first iron member, and control means for controlling the motion of said plate member into and out of engagement with said first iron member teeth; said control means including lever means pivotably connected at a first portion thereof to said second iron member, said lever means including at one end thereof means for camming said plate member teeth into engagement with said first iron member teeth, said given cross-section of one of said aperture and said pin including at least one non-circular portion such that said pin is supported by the wall of said aperture at two different locations, whereby even if there is clearance between the teeth of said first iron member and the teeth of said plate member, the seat back can be positively and securely locked in at least one position relative to said vehicle seat.

2. The articulation of claim 1, wherein said camming means comprises a bearing plate supported within said guiding means for reciprocable motion along a direction parallel with said guiding means, said bearing plate having an upper cam surface engaging with the lower surface of said plate member and including slot means in a lower portion thereof, said lever means having at said one end a pin engaging in said slot means, whereby pivoting motion of said lever means causes said bearing plate to move in said direction parallel to said guiding means so that said upper cam surface cams the plate member in a second direction thereby facilitating engagement of said plate member teeth with said first iron member teeth.

3. The articulation of claim 1, wherein said plate member includes a lower edge having a first portion and a second portion disposed at an angle to said first portion, said first and second portions defining an inverted V-shaped edge, and said camming means comprises a cam surface at said one end of said lever means positioned relative to said plate member lower edge for pushing said plate member in a direction delimited by said guiding means, whereby said plate member teeth may be pushed into engagement with said first iron member teeth.

4. The articulation of claim 3, wherein said guiding means comprise rectilinear guide members.

5. The articulation of claim 4, wherein said guide members are disposed at an oblique angle to a vertical direction.

6. The articulation of claim 3, wherein said guiding means comprise curvilinear guide members.

7. The articulation of claim 1, wherein said pin includes flat surface means engaging said aperture with two-point contact.

8. An articulation for a seat back of a seat for various vehicles, comprising:

a first iron member fixedly mounted with the seat and including an upper part having a pin provided with an axially extensive flat surface, a second iron member coupled to said seat back and including an upper portion having a bore of diameter greater than the diameter of said pin and a lower arcuate edge portion having teeth, a center bearing plate mounted between first guide means fixed on said first iron member, said center bearing plate being supported by said first guide means for sliding movement therebetween and including an upper surface having teeth for engagement with said second iron member arcuate edge portion teeth and a lower rear surface having an arcuate portion, said first iron member including a slot and, lever means pivotably coupled to said first iron member at said slot including means for engaging within said slot and a cam carried by said engaging means having an upper arcuate surface and a lower foot portion, the upper surface being engagable with said arcuate lower rear surface of said center bearing plate and said foot portion being constrained for movement between second guide means, whereby pivoting motion of said lever means in a first direction causes said cam foot portion to engage said second guide means to cause said engaging means to move within said slot and said upper arcuate surface to engage said arcuate lower rear surface of said center bearing plate so that the teeth of the latter are moved into engagement with the teeth of the second iron member, and the seat back is locked with respect to the seat frame in a three-point engagement which includes the cooperation of the second iron member bore with the pin flat surface.

9. The articulation of claim 8, wherein third guide means are fixed on said first iron member and said cam arcuate surface bears against said third guide means when said center bearing plate is in a locked position.

10. The articulation of claim 8, and further including spring means, coupled between said first iron member and said lever means, for urging said center bearing plate into its locked position.

11. An articulation for a seat back of a vehicle seat, comprising:

a first iron member fixed to the frame of the seat back, said first iron member having an aperture located centrally thereof and an arcuate lower edge having teeth, said aperture having a given cross-section, a second iron member fixed to the frame of the vehicle seat and including a pin carried at an upper end thereof, said pin having a given cross-section, the given cross-section of said pin being smaller than that of said aperture, and said pin engaging through said aperture whereby said first and second iron members are pivotably coupled, resilient means, coupled between said first and second iron members, for pivotable biasing said first iron member in a forward direction about said pin, a plate member having a lower surface and an upper edge bearing teeth for locking cooperation with the teeth on the lower edge of said first iron member, spaced parallel guide means, carried by said second iron member, for guiding said plate member in reciprocable directions relative to said guide means, control means for controlling the motion of said plate member into and out of engagement with said first iron member teeth, said control means including lever means pivotably connected at a first portion thereof to said second iron member, said lever means including at one end therof means for camming said plate member teeth into engagement with said first iron member teeth, said given cross-section of one of said aperture and said pin including at least one non-circular portion such that said pin is supported by the wall of said aperture at two different locations, whereby even if there is clearance between the teeth of said first iron member and the teeth of said plate member, the seat back can be positively and securely locked in at least one position relative to said vehicle seat, said camming means of said lever means comprising a bearing plate supported within said guiding means for reciprocable motion along a direction parallel with said guiding means, said bearing plate having an upper cam surface engaging with the lower surface of said plate member and including slot means in a lower portion thereof, said lever means having at said one end a pin engaging in said slot means, whereby pivoting motion of said lever means causes said bearing plate to move in said direction parallel to said guiding means so that said upper cam surface cams the plate member in a second direction thereby facilitating engagement of said plate member teeth with said first iron member teeth.

12. An articulation for a seat back of a vehicle seat, comprising:

a first iron member fixed to the frame of the seat back, said first iron member having an aperture located centrally thereof and an arcuate lower edge having teeth, said aperture having a given cross-section, a second iron member fixed to the frame of the vehicle seat and including a pin carried at an upper end thereof, said pin having a given cross-section, the given cross-section of said pin being smaller than that of said aperture, and said pin including flat surface means engaging said aperture with two-point contact and engaging through said aperture whereby said first and second iron members are pivotably coupled, resilient means, coupled between said first and second iron members, for pivotably biasing said first iron member in a forward direction about said pin, spaced parallel guide means, carried by said second iron member, for guiding said plate member in reciprocable directions relative to said guide means, a plate member positioned between said guide means and having a lower surface and an upper edge bearing teeth for locking cooperation with the teeth on the lower edge of said first iron member, control means for controlling the motion of said plate member into and out of engagement with said first iron member teeth, said control means including lever means pivotably connected at a first portion thereof to said second iron member, said lever means including at one end thereof means for camming said plate member teeth into engagement with said first iron member teeth, said given cross-section of one of said aperture and said pin being supported by the wall of said aperture at two different locations, whereby even if there is clearance between the teeth of said first iron member and the teeth of said plate member, the seat back can be positively and securely locked in at least one position relative to said vehicle seat.

* * * * *

UNITED STATES PATENT AND TRADEMARK OFFICE
CERTIFICATE OF CORRECTION

PATENT NO. : 4,659,146

DATED : April 21, 1987

INVENTOR(S) : JANIAUD, Andre M.C.

It is certified that error appears in the above-identified patent and that said Letters Patent is hereby corrected as shown below:

Column 4, line 46, "G32" should read -- F32 --;

Column 8, line 29, "engagable" should read -- engageable --;

Column 3, line 15, "based" should read -- biased --.

Signed and Sealed this

Seventeenth Day of November, 1987

Attest:

DONALD J. QUIGG

*Attesting Officer*  *Commissioner of Patents and Trademarks*